(12) United States Patent
Cierniak et al.

(10) Patent No.: US 8,645,363 B2
(45) Date of Patent: Feb. 4, 2014

(54) SPREADING COMMENTS TO OTHER DOCUMENTS

(75) Inventors: Michal Cierniak, Palo Alto, CA (US);
Dmitry Barashev, Saint-Petersburg (RU)

(73) Assignee: Google Inc., Mountain VIew, CA (US)

( * ) Notice: Subject to any disclaimer, the term of this patent is extended or adjusted under 35 U.S.C. 154(b) by 110 days.

(21) Appl. No.: 13/056,948

(22) PCT Filed: Aug. 12, 2009

(86) PCT No.: PCT/RU2009/000399
§ 371 (c)(1),
(2), (4) Date: Jan. 31, 2011

(87) PCT Pub. No.: WO2011/019297
PCT Pub. Date: Feb. 17, 2011

(65) Prior Publication Data
US 2011/0264653 A1    Oct. 27, 2011

(51) Int. Cl.
*G06F 7/00* (2006.01)
*G06F 17/30* (2006.01)

(52) U.S. Cl.
USPC ............................ 707/723; 707/791; 707/736

(58) Field of Classification Search
USPC .............................. 707/723, 736, 791; 706/12
See application file for complete search history.

(56) References Cited

U.S. PATENT DOCUMENTS

2002/0019856 A1    2/2002   Bezos et al.

FOREIGN PATENT DOCUMENTS

WO    2007/070791    6/2007

OTHER PUBLICATIONS

W. Jin et al., "A Semi-Naive Bayesian Method Incorporating Clustering with Pair-wise Constraints for Auto Image Annotation", ACM MM 2004, pp. 336-339.*
K. Bielenberg and M. Zacher, "Groups in Social Software: Utilizing Tagging to Integrate Individual Contexts for Social Navigation", Masters Thesis, Universidat Bremen, Aug. 16, 2005.*
Notification of International Search Report and Written Opinion of the International Searching Authority, or the Declaration for PCT/RU2009/000399, 12 pages.

* cited by examiner

*Primary Examiner* — Ann Chempakaseril
(74) *Attorney, Agent, or Firm* — Harrity & Harrity, LLP

(57) ABSTRACT

A server device is configured to receive a comment associated with a first document, the comment corresponding to a first portion of the first document; identify a second document that includes a second portion that matches the first portion of the first document; and store the comment in association with the first document and the second document. The server device is further configured to receive, from a client device, information that the client device is accessing the second document, and transmit the comment for presentation in connection with the second document on a display associated with the client device.

34 Claims, 12 Drawing Sheets

| AUTHOR | TIMESTAMP | COMMENT CONTENT | DOC PORTION | ORIGINAL DOC ID | OTHER DOC IDS | RATING(S) |
|---|---|---|---|---|---|---|
| 510 | 520 | 530 | 540 | 550 | 560 | 570 |

SPREADING COMMENTS TO OTHER DOCUMENTS

BACKGROUND

Many techniques are available to users today to find information on the world wide web ("web"). For example, users often use web browsers and/or search engines to find information of interest.

A user may enter a search query into a search box of a browser and the browser may submit the search query to a search engine. The search engine may identify documents that match the search query, rank the documents based on various factors, and return a ranked list of documents to the user. The user may select a document from the list and request the document. A browser may retrieve the requested document and display the document to the user in a browser window.

The amount of information that is available to users on the web can be overwhelming. It is a difficult task to present users with information in which the users are interested.

SUMMARY

According to one implementation, a method, performed by a server device, may include receiving a comment associated with a first document, the comment corresponding to a portion of the first document; determining that a size of the portion of the first document is greater than a threshold size; identifying one or more second documents when the size of the portion of the first document is greater than the threshold size, where each of the one or more second documents may include a portion that matches the portion of the first document; storing, in a memory associated with the server device, the comment in association with the first document and the one or more second documents; and presenting the comment in connection with one of the one or more second documents when the one of the one or more second documents is accessed by a user.

According to another implementation, a system may include one or more devices. The one or more devices may receive a comment associated with a first document, the comment providing an opinion or remark regarding a portion of the first document; determine that a size of the portion of the first document is greater than a threshold size; identify a second document when the size of the portion of the first document is greater than the threshold size, where the second document may include a portion that matches the portion of the first document; store the comment in association with the first document and the second document; receive, from a client device, information that the client device is accessing the second document; and transmit the comment for presentation in connection with the second document on a display associated with the client device.

According to yet another implementation, a server device may include a memory and a processor. The processor may receive a comment associated with a first document, the comment corresponding to a first portion of the first document; identify a second document that includes a second portion that matches the first portion of the first document; store, in the memory, the comment in association with the first document and the second document; receive, from a client device, information that the client device is accessing the second document; and transmit the comment for presentation in connection with the second document on a display associated with the client device.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a diagram of exemplary fields that may be provided within the comments database of FIG. 4;

DETAILED DESCRIPTION

The following detailed description refers to the accompanying drawings. The same reference numbers in different drawings may identify the same or similar elements.

Overview

For some documents, users might like to see users' comments regarding these documents. A "comment," as used herein, may include text (e.g., styled or markup text, such as HyperText Markup Language (HTML)), audio data, video data, and/or image data that provides an opinion of, or otherwise remarks upon, the contents of a document or a portion of a document. One example of a comment may include a document whose sole purpose is to contain the opinion/remark. Another example of a comment may include a blog post. Yet another example of a comment may include a web page or a news article that remarks upon an item (e.g., a product, a service, a company, a web site, a person, a geographic location, or something else that can be remarked upon).

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 1:
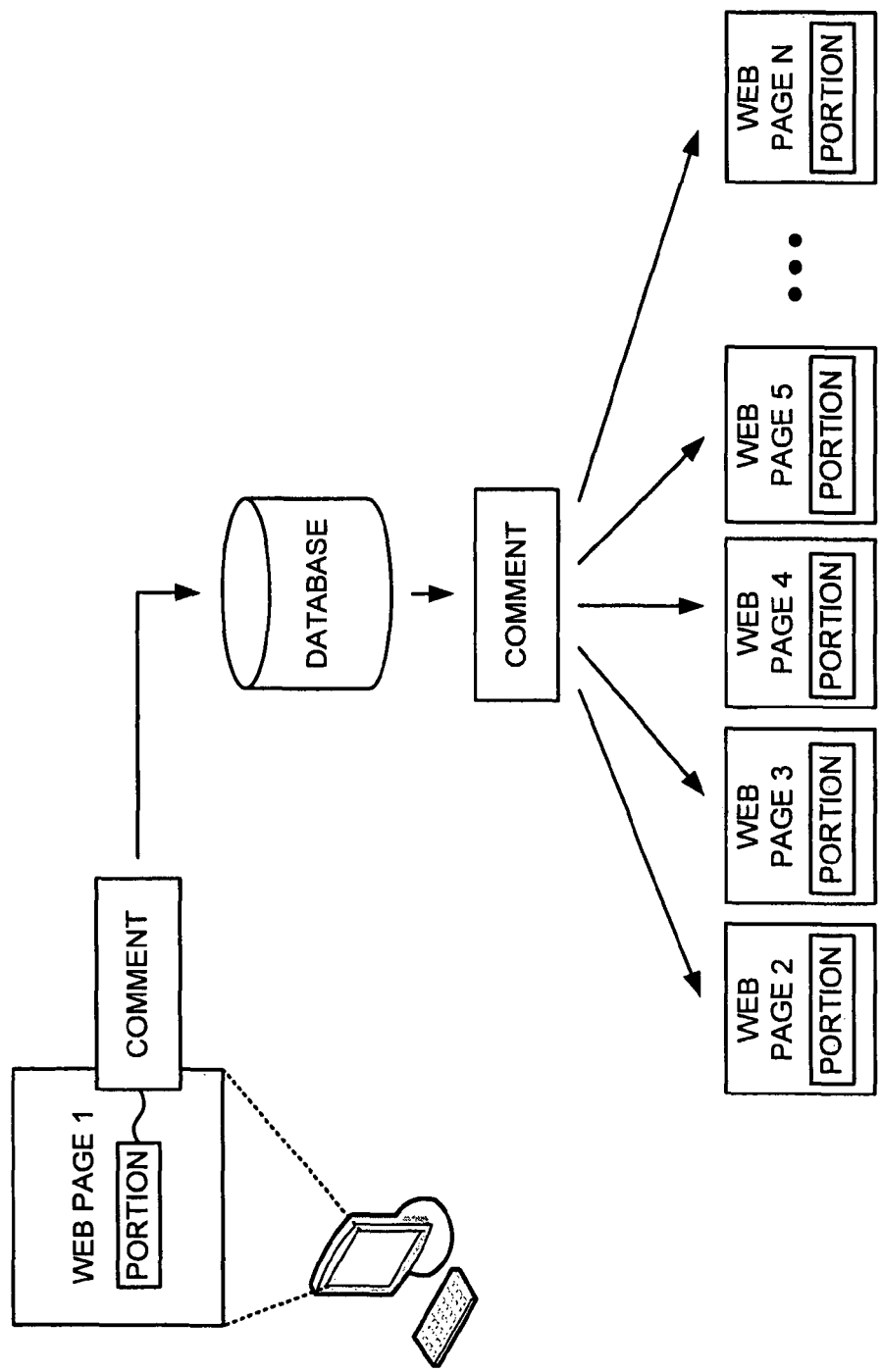
FIG. 1 is a diagram illustrating an exemplary overview of an implementation described herein.

FIG. 1 is a diagram illustrating an exemplary overview of an implementation described herein. As shown in FIG. 1, assume that a user requests access to a web page about a particular topic (shown as "web page 1" in FIG. 1). The user may decide to provide a comment regarding a portion of the web page. In this case, the user may select a portion of the web page to comment upon (shown as "portion" in FIG. 1). The user might activate the commenting function to provide the comment. The user may then provide an opinion or remark for the comment (shown as "comment" in FIG. 1).

The comment may be stored in a database in association with the web page. Other web pages that contain the same, or similar, portion may be identified (shown as web pages 2, 3, 4, 5, ..., N in FIG. 1). The comment may then be associated with these other web pages too. Thus, when a user accesses one of these other web pages, the comment (which was originally created for a portion of web page 1) can also be presented.

Exemplary Environment

Figure 2:
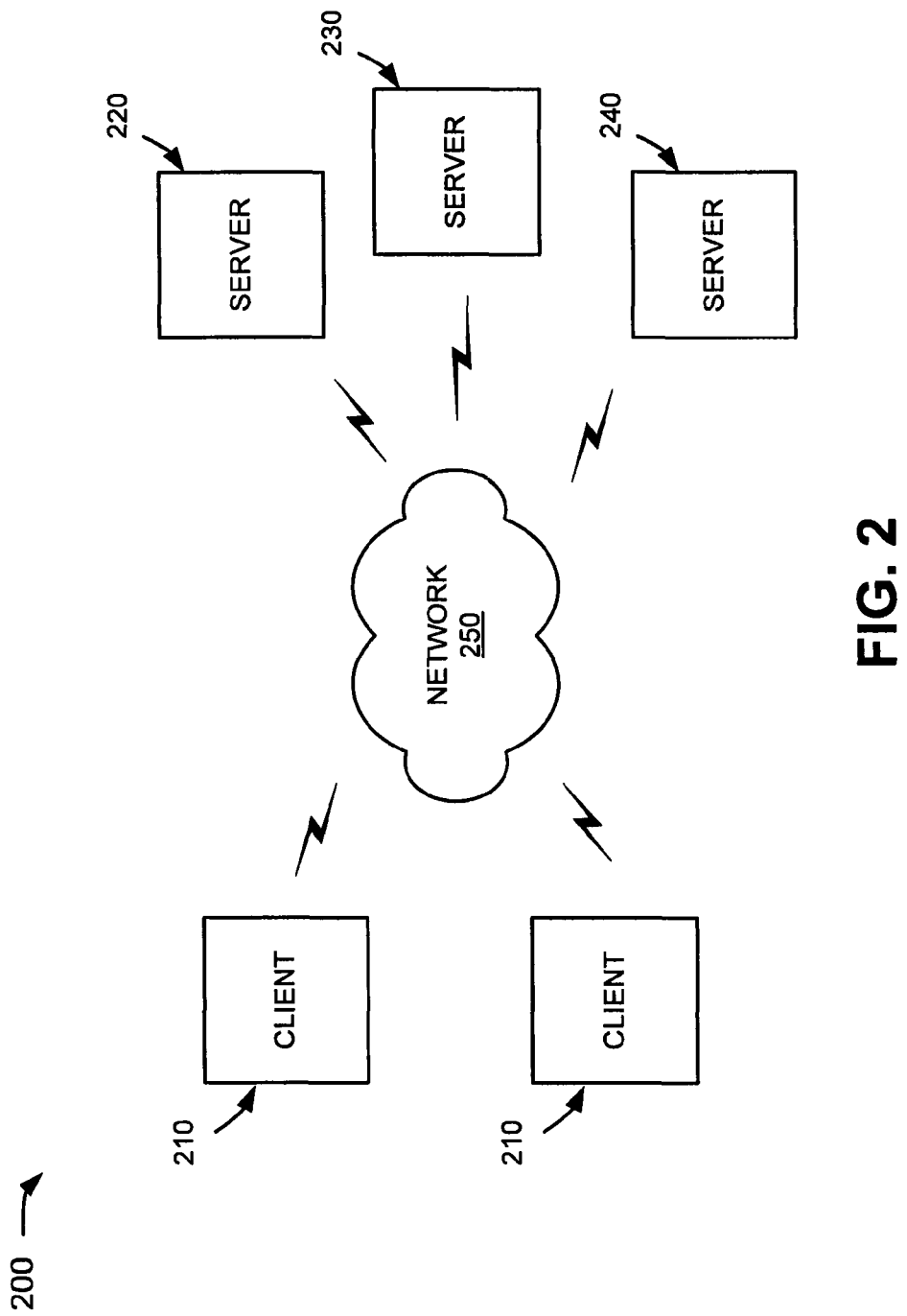
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executed by one of these devices. In one implementation, a client 210 may include a browser application that permits documents to be searched and/or accessed. Client 210 may also include software, such as a plug-in, an applet, a dynamic link library (DLL), or another executable object or process, that may operate in conjunction with (or be integrated into) the browser to obtain and display comments. Client 210 may obtain the software from server 220 or from a third party, such as a third party server, disk, tape, network, CD-ROM, etc. Alternatively, the software may be pre-installed on client 210. For the description to follow, the software will be described as integrated into the browser.

In one implementation, as described herein, the browser may provide a commenting function. The commenting function may permit a user to generate a comment regarding a document, permit the user to view a comment that was previously generated by the user or by other users, and/or permit the user to remove a comment from presentation via the browser (e.g., hide the comment from view).

Servers 220-240 may include server entities that gather, process, search, and/or maintain documents in a manner described herein. In one implementation, server 220 may gather, process, and/or maintain comments that are associated with particular documents. Servers 230 and 240 may store or maintain comments and/or documents.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices. The term "server system," as used herein, is intended to refer to a single server 220-240 (whether implemented as a single device or multiple devices) or a group of servers 220-240.

Network 250 may include any type of network, such as a local area network (LAN), a wide area network (WAN), a telephone network (e.g., the Public Switched Telephone Network (PSTN) or a cellular network), an intranet, the Internet, or a combination of networks. Clients 210 and servers 220-240 may connect to network 250 via wired and/or wireless connections.

Exemplary Components of Client and/or Server

Figure 3:
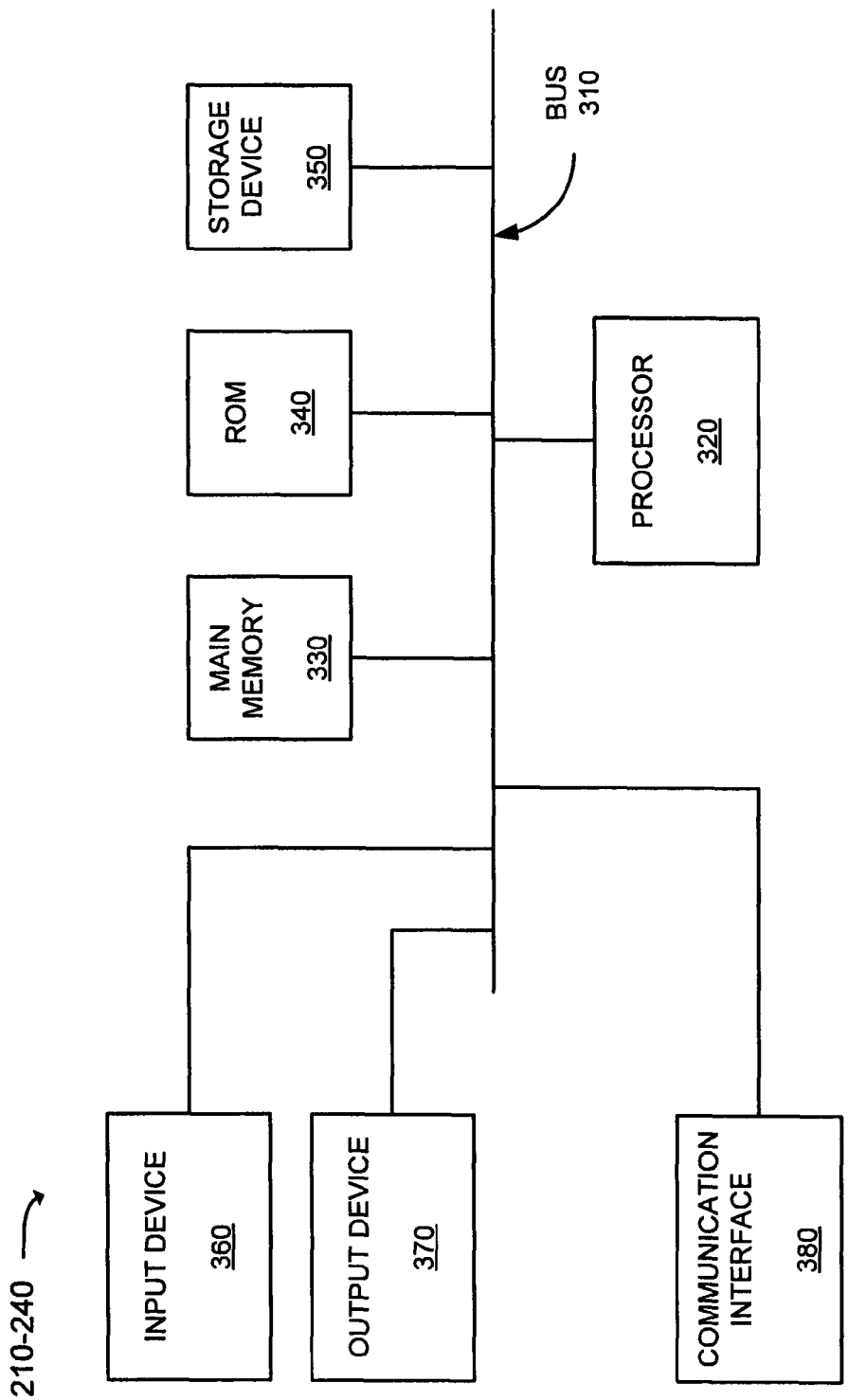
FIG. 3 is a diagram of exemplary components of a client or a server of FIG. 2.

FIG. 3 is a diagram of exemplary components of a client or server entity (hereinafter called "client/server entity"), which may correspond to one or more of clients 210 and/or servers 220-240. As shown in FIG. 3, the client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory. The term "memory," as used herein, is intended to be broadly interpreted to refer to any type of memory or storage device, such as main memory 330, ROM 340, and storage device 350.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain operations relating to the generation and presentation of comments. The client/server entity may perform these operations in response to processor 320 executing software instructions contained in a computer-readable medium, such as memory 330. A computer-readable medium may be defined as a logical or physical memory device. A logical memory device may include a space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Functional Components of Server

Figure 4:
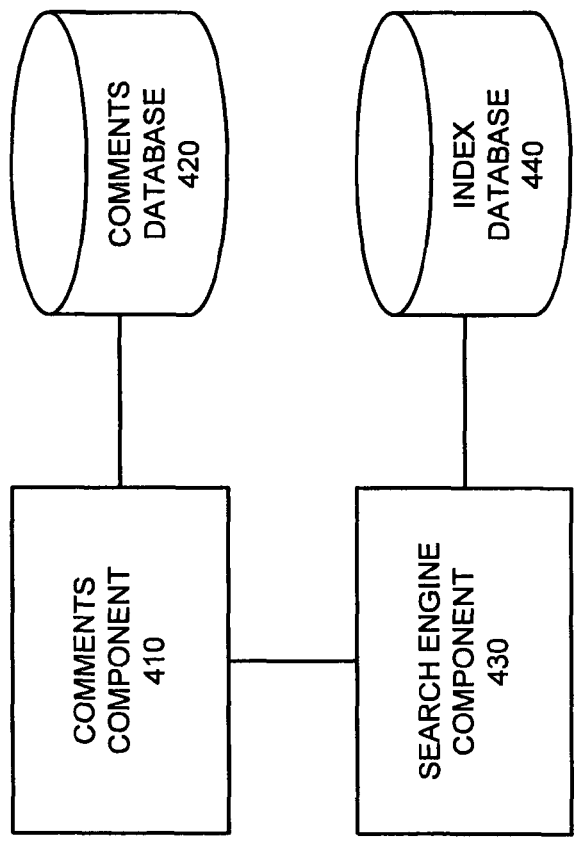
FIG. 4 is a diagram of functional components of a server of FIG. 2.

FIG. 4 is a diagram of exemplary functional components of server 220. As shown in FIG. 4, server 220 may include a comments component 410, a comments database 420, a search engine component 430, and an index database 440. In another implementation, server 220 may include more or fewer functional components. For example, one or more of the functional components shown in FIG. 4 may be located in a device separate from server 220.

Comments component 410 may interact with clients 210 to obtain and/or serve comments. For example, a user of a client 210 may access a particular document and generate a comment regarding a portion of the document. A "document portion," as used herein, is intended to refer to less than the entire document. The document portion may include some amount of text (e.g., some number of words), an image, a video, or some audio. Client 210 may send the comment and information regarding the document portion to comments component 410.

Comments component 410 may receive the comment provided by a client 210 in connection with the particular document. Comments component 410 may gather certain information regarding the comment, such as information regarding the author of the comment, a timestamp that indicates a date and/or time at which the comment was created or modified, the content of the comment, the portion of the document with which the comment is associated (e.g., the actual portion or some identifier that indicates where the portion is located within the document), and/or an identifier, such as a uniform resource locator (URL), associated with the document. Comments component 410 may receive at least some of this information from client 210. Comments component 410 may store the information regarding the comment in comments database 420.

Comments component 410 may also serve a comment in connection with a document accessed by a client 210. In one implementation, comments component 410 may obtain a comment from comments database 420 and provide that comment to client 210 when client 210 accesses a document with which that comment is associated in comments database 420.

Comments database 420 may store information regarding comments. In one implementation, comments database 420 may include various fields that are separately searchable. Comments component 410 may search comments database 420 to identify comments associated with a particular author or a particular document.

FIG. 5 is a diagram of exemplary fields that may be provided within comments database 420. As shown in FIG. 5, comments database 420 may include an author field 510, a timestamp field 520, a comment content field 530, a document portion field 540, an original document identifier (ID) field 550, an other document identifiers (IDs) field 560, and a rating(s) field 570. In other implementations, comments database 420 may include more or fewer fields.

Author field 510 may store information regarding the author of the comment. For example, author field 510 may store the name of the author (e.g., actual name or online name), an image of the author, a graphic associated with the author, the name of a geographic location of the author, or other information regarding the author. Timestamp field 520 may store the date and/or time that the comment was created or modified. The date/time for timestamp field 520 may be generated by client 210 at which the comment was created or modified, or may be generated by server 220 based on a date/time at which the comment or modification is received from client 210. For a comment that has multiple revisions, timestamp field 520 may store the date and/or time that one or more, or all, of the revisions occurred.

Comment content field 530 may store the content of the comment. For example, the content of a comment may include text, video data, image data, and/or audio data. In one implementation, comment content field 530 may store the actual content of the comment. In another implementation, comment content field 530 may store a pointer to a storage location where the actual content of the comment is stored. Document portion field 540 may store the content of the document portion with which the comment is associated. For example, the content of the document portion may include text, video, image, and/or audio data. In one implementation, document portion field 540 may store the actual content of the document portion. In another implementation, document portion field 540 may store a pointer to a storage location where the actual content of the document portion is stored. In yet another implementation, document portion field 530 may store an identifier, such as an offset, that identifies where the document portion occurs within the document in which the document portion is located.

Original document identifier field 550 may store an address (e.g., a URL), or another type of unique identifier, for the document for which the comment was originally created. Other document identifiers field 560 may store an address, or another type of unique identifier, for one or more other documents with which the comment has been associated. As will be described in detail below, a comment created regarding a portion of one document may be associated with other documents that have the same, or similar, portion.

Rating(s) field 570 may store a rating for the comment. A rating may be based on user feedback regarding the comment. For example, users may be permitted to rate a comment (favorably or unfavorably). These ratings may be used to determine whether and/or how to present the comment in connection with a particular document or any document. In one implementation, a single rating may be maintained for a comment. That single rating may be used to determine whether and/or how to present the comment in connection with any document with which the comment has been associated. In another implementation, a separate rating may be maintained for each document (or for a group of documents) with which the comment has been associated. In this case, the rating, associated with a particular document, may be used to determine whether to present the comment in connection with that particular document.

Returning to FIG. 4, search engine component 430 may receive the document portion from comments component 410 and locate other documents that include the same, or similar, document portion. When the document portion includes text, search engine component 430 may locate other documents that include the same, or similar, text. When the document portion includes image data, search engine component 430 may locate other documents that include the same, or similar, image data. When the document portion includes video data, search engine component 430 may locate other documents that include the same, or similar, video data. When the document portion includes audio data, search engine component 430 may locate other documents that include the same, or similar, audio data.

Techniques exist for locating exactly matching text, image data, video data, and audio data. Search engine component 430 may use one of these techniques to locate a document with a matching document portion. Techniques also exist for locating approximately matching text, image data, video data, and audio data. These techniques may determine a concept or topic associated with the document portion and locate another document portion relating to the same concept or topic. Alternatively, or additionally, these techniques may identify two document portions as matching if at least a threshold amount of the two document portions match. Alternatively, or additionally, these techniques may be based on synonyms.

In one implementation, a document portion has to be greater than a particular size before search engine component 430 locates matching document portions in other documents. For a document portion that includes text, the document portion may need to include more than a threshold number of terms (e.g., words). For a document portion that includes image data, the document portion may need to be larger than a certain image size. For a document portion that includes video or audio data, the document portion may need to be larger than a certain length (or duration).

Search engine component 430 may locate documents by searching index database 440. Index database 440 may include one or more indexes. If index database 440 includes more than one index, index database 440 may store the indexes in the same data structure or in different data structures that may be searched independently of one another. Each of the one or more indexes may include multiple index entries, with each entry containing a term stored in association with an item, from a document, in which the term appears, and a location within the document where the term appears.

Creating a Comment

Figure 6:
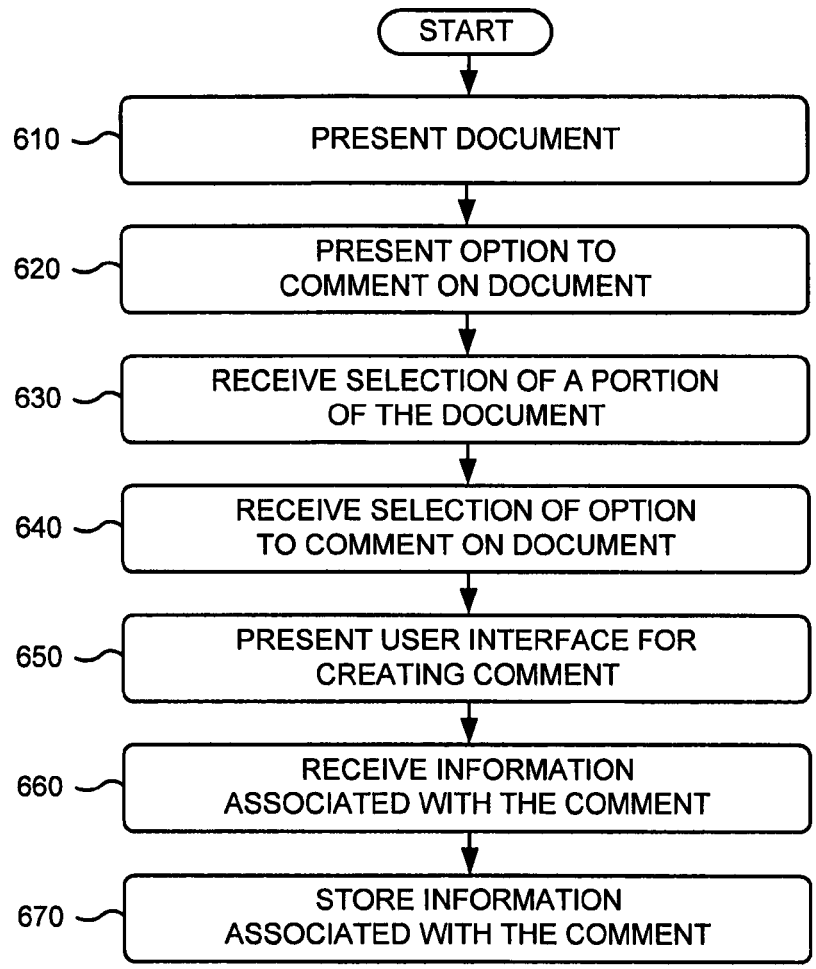
FIG. 6 is a flowchart of an exemplary process for creating a comment.

FIG. 6 is a flowchart of an exemplary process for creating a comment. In one implementation, the process of FIG. 6 may be performed by one or more components within client 210, server 220, or a combination of client 210 and server 220. In another implementation, the process may be performed by one or more components within another device or a group of devices separate from or including client 210 and/or server 220. Also, while FIG. 6 shows blocks in a particular order, the actual order may differ. For example, some blocks may be performed in parallel or in a different order than shown in FIG. 6.

The process of FIG. 6 may include presenting a document to a user of client 210 (block 610). For example, the user may access the document via a browser application operating on client 210. To obtain access to the document, for example, the user might enter an address (e.g., a URL) into the address field of the browser, the user might select a document from a list of documents (e.g., a list of favorites or bookmarks), or the user might perform a search using a search engine and select a search result corresponding to the document.

An option to provide a comment regarding the document may be presented (block 620). For example, the browser may include a user interface item (e.g., a button, a menu item, etc.) that may permit the user to turn on and turn off the commenting function provided by the browser. The user may select this user interface item to create a comment, to view a comment, and/or to remove a presented comment from view (e.g., hide the comment from view).

Figure 7:
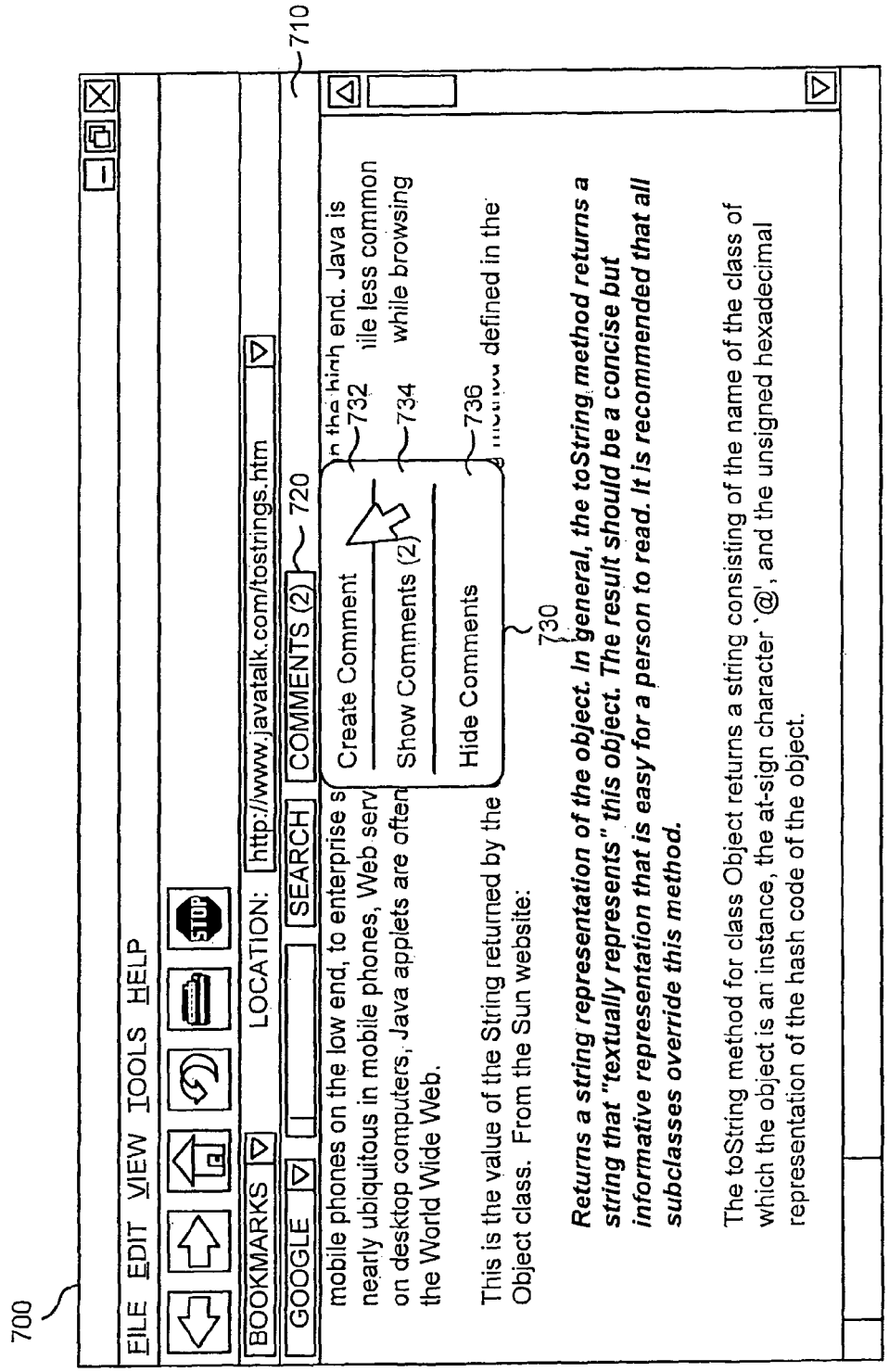
FIGS. 7 and 8 are diagrams of examples of creating a comment.

FIG. 7 is a diagram of an exemplary user interface that may be presented to a user to permit the user to activate the commenting function of the browser. As shown in FIG. 7, a browser window 700 may include an add-on toolbar 710 that includes a search box and a number of software buttons. In one implementation, toolbar 710 may include a comments button 720. Comments button 720 may optionally include information regarding the number of comments (shown as "(2)" in FIG. 7) that have been previously associated with the document that the user is currently accessing (shown as "www.javatalk.com/tostrings.htm" in FIG. 7).

Comments button 720 may permit the user to turn on and off the commenting function. In one implementation, selection of comments button 720 may cause a menu 730 to be presented. Menu 730 may include a number of options including, for example, an option to create a comment 732, an option to show previously created comments 734, and an option to hide the comments 736. The user may select option 732 to generate a comment regarding the document that the user is currently accessing. The user may select option 734 to view a comment that was previously associated with the document that the user is currently accessing (e.g., FIG. 7 shows that two comments have been previously associated with the document). The user may select option 736 to remove any presented comments from view (e.g., hide the comments from view).

Returning to FIG. 6, selection of a portion of the document may be received (block 630). For example, the user may select a portion of the document upon which to comment (referred to hereinafter as "document portion"). The document portion may correspond to text, video data, image data, and/or audio data from the document. As explained above, the document portion may include less than the entirety of the document. The user might select the document portion using any existing technique, such as a technique involving the user's mouse or keyboard.

Selection of the option to provide a comment regarding the document may be received (block 640). For example, the user might activate the commenting feature. In one implementation, the user might activate the commenting feature by selecting an item from a menu or by selecting a button on a toolbar. As shown in FIG. 7, for example, the user may select comments button 720 on toolbar 710 within browser window 700, and/or may select option 734 on menu 730.

A user interface may be presented to the user for creating the comment (block 650). For example, in response to receiving selection of comments button 720, the browser may present the user with a user interface via which the user may create a comment regarding the document portion. The content of the comment may be received (block 660). For example, the user may, via the user interface, input the content of the comment and/or insert a file as the content of the comment.

Figure 8:
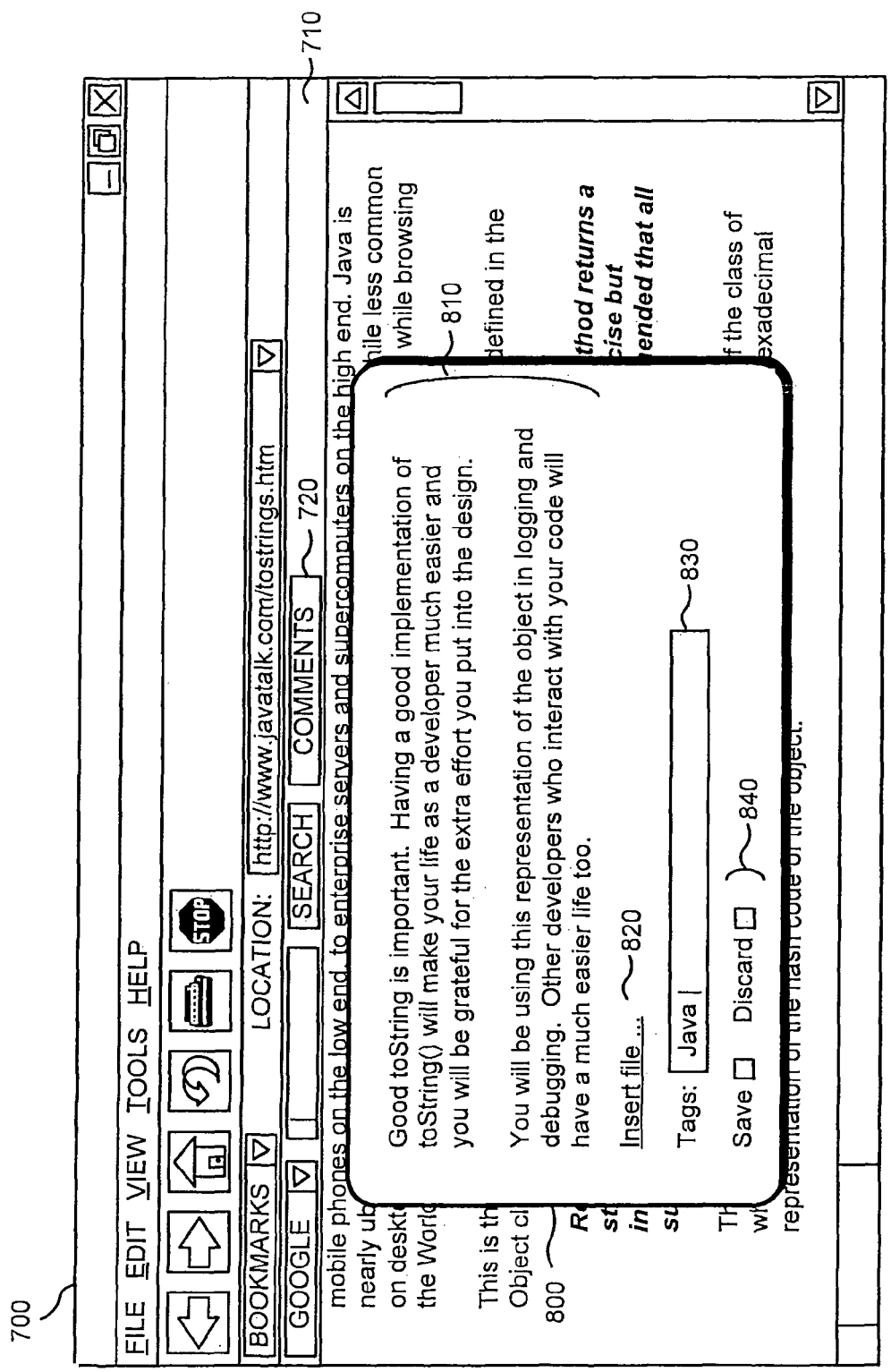

FIG. 8 is a diagram of an exemplary user interface that may be presented to a user to permit the user to create a comment. As shown in FIG. 8, browser window 700 may present a user interface 800 via which the user may enter the contents of the comment. User interface 800 may include input section 810, an option 820 to insert a file, a tags section 830, and save/discard options 840. Input section 810 may include an area into which the user may insert the contents of the comment (whether in the form of text, image data, video data, and/or audio data). Option 820 may permit the user to identify a file to be inserted into or attached to the comment. Tags section 830 may permit the user to identify keywords to associate with the comment. Save/discard options 840 may permit the user to select whether to save the comment or discard the comment without saving the comment.

Returning to FIG. 6, information associated with the comment may be stored (block 670). For example, the browser of client 210 may send information associated with the comment to comments component 410 of server 220. This information may include, for example, the name of the author of the comment (e.g., the user's name), a timestamp indicating the date and/or time that the comment was created or modified, the content of the comment, the document portion to which the comment corresponds, and/or the document identifier for the document containing the document portion (referred to herein as "originating document"). Comments component 410 may create or update an entry in comments database 420 using this information.

Spreading Comment to Other Documents

Figure 9:
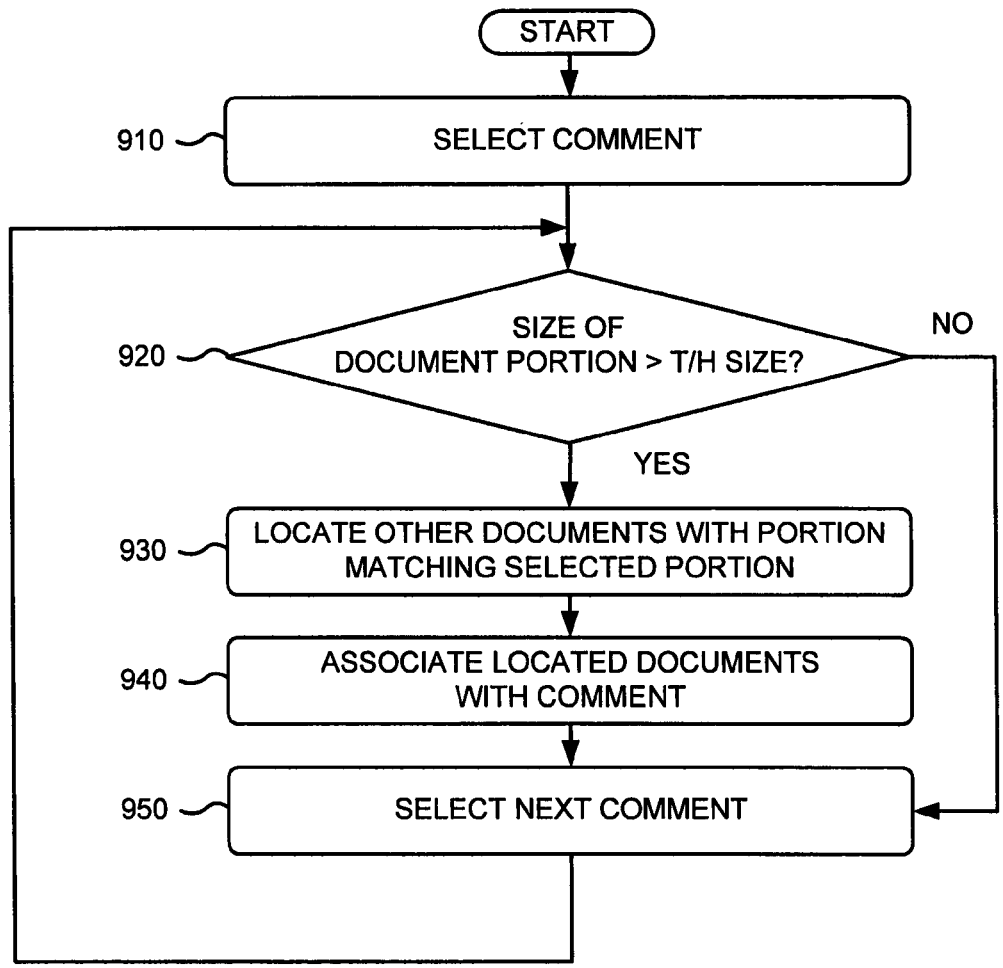
FIG. 9 is a flowchart of an exemplary process for spreading a comment to other documents.

FIG. 9 is a flowchart of an exemplary process for spreading a comment to other documents. In one implementation, the process of FIG. 9 may be performed by one or more components within server 220, client 210, or a combination of server 220 and client 210. In another implementation, the process may be performed by one or more components within another device or a group of devices separate from or including server 220 and/or client 210. Also, while FIG. 9 shows blocks in a particular order, the actual order may differ. For example, some blocks may be performed in parallel or in a different order than shown in FIG. 9.

The process of FIG. 9 may be periodically performed on comments stored in comments database 420. Alternatively, the process of FIG. 9 may be performed, with regard to a particular comment, after information associated with that particular comment is stored in comments database 420. As described above, the information associated with a comment, stored in comments database 420, may include, for example, the name of the author of the comment, a timestamp indicating the date and/or time that the comment was created or modified, the content of the comment, the document portion to which the comment corresponds, and/or the document identifier for the originating document.

A comment may be selected (block 910). For example, comments component 410 may select an entry, corresponding to a comment, in comments database 420. It may be determined whether the size of the document portion, corresponding to the comment, is greater than a threshold (T/H) size (block 920). For example, comments component 410 may determine whether the size of the document portion included in, or identified by, the entry (e.g., in the document portion field 540 of the entry) is greater than a threshold size. When the document portion takes the form of text, comments component 410 may determine whether the text includes a number of terms (e.g., words) greater than a threshold number of terms. When the document portion takes the form of image data, comments component 410 may determine whether the image data has an image size greater than a threshold image size. When the document portion takes the form of video or audio data, comments component 410 may determine whether a length (or duration) of the video or audio data is greater than a threshold length (or duration).

When the size of the document portion is greater than the threshold size (block 920—YES), other documents (other than the originating document) that contain the same, or similar, document portion may be located (block 930). For example, when the size of the document portion is greater than the threshold size, comments component 410 may send the document portion to search engine component 430, or otherwise identify the document portion to search engine component 430.

In one implementation, search engine component 430 may locate documents that contain a document portion that exactly matches the document portion of the originating document. In another implementation, search engine component 430 may locate documents that contain a document portion that is similar to the document portion of the originating document. In this case, search engine component 430 may determine a degree of match between the document portions and may generate a score that reflects this degree of match. Exemplary techniques for determining whether two document portions match, will be described below.

The comment may be associated with the located documents (block 940). For example, search engine component 430 may provide information regarding the located documents to comments component 410. In one implementation, the information, provided to comments component 410, may include addresses (e.g., URLs) of the located documents. In another implementation, the information, provided to comments component 410 may additionally include the score reflecting the degree of match between the document portions. Comments component 410 may update the entry, corresponding to the comment, in comments database 420 with the information regarding the located documents. For example, comments component 410 may store the addresses of the located documents (and perhaps the scores reflecting the degree of match between the document portions) in the other document identifiers field 560 in comments database 420.

A next comment may be selected (block 950). For example, comments component 410 may select another comment to process and return to block 920 or block 930. In the implementation where a comment is processed when an entry for the comment is created in comments database 420, the process of FIG. 9 may end without selecting a next comment to process.

When the size of the document portion is not greater than the threshold size (block 920—NO), a next comment may be selected (block 950). For example, comments component 410 may select another comment to process and return to block 920 or block 930. In one implementation, comments component 410 may mark an entry containing a comment associated with a document portion with a size that is not greater than the threshold size by, for example, setting a flag. In this case, comments component 410 may select a next comment to process as a comment that has a document portion with a size that is greater than the threshold size. In the implementation where a comment is processed when an entry for the comment is created in comments database 420, the process of FIG. 9 may end without selecting a next comment to process.

Document portions of small size (e.g., with a size not greater than the threshold) may result in the identification of a large number of documents with matching document portions, where these documents do not contain content that is relevant to the subject of the comment. By requiring that the document portion have a certain size, before associating the comment with other documents (i.e., other than the originating document), may result in the comments being more meaningfully presented in connection with other documents.

In another implementation, a feature, other than (or in addition to) the size of the document portion for which the comment was originally created, may be used to determine whether to associate a comment with other documents. In one alternative implementation, for example, comments may be associated with other documents based on a score assigned to the comment. A score may be generated for a comment using one or more factors that will be described in detail below. A comment may be associated with the other documents when the score of the comment is greater than a certain threshold. In yet another alternative implementation, other features, or a combination of features, may be used to determine whether to associate a comment with other documents.

Exemplary Techniques for Identifying Matching Document Portions

As explained above, search engine component 430 may locate documents that contain a document portion that matches the document portion of the originating document. The technique(s) used to identify a match may differ based on whether the document portion includes text, image data, video data, and/or audio data.

With regard to text, for example, search engine component 430 may determine, given the text of the document portion, whether the document portion text matches text in other documents included in index database 440. Search engine component 430 may generate a confidence score for each document that indicates how near a match the document portion text is to text in the other documents. Search engine component 430 may identify other documents with confidence scores above a certain threshold as documents containing document portions matching the document portion of the originating document.

There are various techniques that search engine component 430 may use to identify a match. In one implementation, search engine component 430 may use a chunking technique. The chunking technique takes sets of contiguous terms (where each set may share one or more terms with a next or preceding set, or each set may share no terms with the next or preceding set) (called "chunks"), performs a hash on the chunks, and compares the number of matching chunks. By comparing the chunks, search engine component 430 may determine a percentage of overlap between two sets of text in two different documents. Search engine component 430 may generate a confidence score based on the amount of overlap between the chunks of the two sets of text.

In another implementation, search engine component 430 may use a similarity detection technique. The similarity detection technique may consider a set of text as a vector of terms. For example, a vector may be created for each group of terms (e.g., sentence) in the set of text. The vector may include an entry for each unique term in the group. The similarity detection technique may generate a confidence score based on the number of the vectors that match between the two sets of text.

In yet another implementation, search engine component 430 may use a different technique, or a combination of techniques, to identify a match between two sets of text. For example, search engine component 430 may perform a search on index database 440 to identify documents that contain at least a threshold number of terms of the document portion text. Search engine component 430 may then perform a text-matching technique to determine a confidence score that indicates how near a match the document portion text is to text in the identified documents.

In a further implementation, search engine component 430 may use a machine learning technique to learn rules for a model that may be used to determine whether two sets of text match. This technique may identify synonyms of terms and/or identify text that relate to a same topic or concept even if the text does not contain terms in common.

With regard to image data, search engine component 430 may determine, given the image data of the document portion, whether the document portion image matches an image in a document within index database 440. Search engine component 430 may generate a confidence score for each document in index database 440 that indicates how near a match the document portion image is to an image in the documents. Search engine component 430 may identify documents with confidence scores above a certain threshold as documents with document portions that match the document portion of the originating document.

There are various techniques that search engine component 430 may use to identify a match. In one implementation, search engine component 430 may use a technique that compares features of images. A number of different possible image features may be used. Examples of image features that may be used include image features based on, for example, intensity, color, edges, texture, wavelet-based techniques, or other aspects of the image.

Regarding intensity, for example, each image may be divided into small patches (e.g., rectangles, circles, etc.) and an intensity histogram computed for each patch. Each intensity histogram may be considered to be a feature for the image. Similarly, as an example of a color-based feature, a color histogram may be computed for each patch (or for different patches) within each image. A color histogram can be similarly computed to obtain a possible color-based histogram. The color histogram may be calculated using any known color space, such as the RGB (red, green, blue) color space, YIQ (luma (Y) and chrominance (IQ)), or another color space.

Histograms can also be used to represent edge and texture information. For example, histograms can be computed based on patches of edge information or texture information in an image. For wavelet based techniques, a wavelet transform may be computed for each patch and used as an image feature.

In some implementations, to improve computation efficiency, features may be computed only for certain areas within images. For example, "objects of interest" within an image may be determined and image features may only be computed for the objects of interest. For example, if the image feature being used is a color histogram, a histogram may be computed for each patch in the image that includes an object of interest. Objects of interest within an image can be determined in a number of ways. For example, for color, objects of interest may be defined as points where there is high variation in color (i.e., areas where color changes significantly). In general, objects of interest can be determined mathematically in a variety of ways and are frequently based on determining discontinuities or differences from surrounding points. The Scale-Invariant Feature Transform (SIFT) algorithm is an example of one technique for locating objects of interest.

Additionally, in some implementations, the various features described above may be computed using different image scales. For example, an image can be examined and features computed in its original scale and then features may be successively examined at smaller scales. Additionally or alternatively, features may be selected as features that are scale invariant or invariant to affine transformations. The SIFT technique, for example, can be used to extract distinctive invariant objects from images. The extracted objects are invariant to image scale and rotation.

For each feature that is to be used, a comparison function may be used. In general, a comparison function may operate to generate a confidence score defining a similarity between a particular feature computed for two images. For image features based on histograms, for example, the comparison function may include a simple histogram comparer function. For image features other than those based on histograms, a different comparison function may be used.

In another implementation, search engine component 430 may use another technique, or a combination of techniques, to determine whether two images match. For example, search engine component 430 may use a hash-based technique, a byte-by-byte comparison technique, or a cyclic redundancy check (CRC) technique. Additionally, or alternatively, search engine component 430 may compare tag information (e.g., labels or other meta-data assigned to the images) to determine whether two images match.

With regard to video data, search engine component 430 may determine, given the video of the document portion, whether the document portion video matches a video in a document of index database 440. Search engine component 430 may generate a confidence score for each document in index database 440 that indicates how near a match the document portion video is to a video in the documents (e.g., a document may include a link for playing or downloading the video or provide a player via which the video can be played). Search engine component 430 may identify documents with confidence scores above a certain threshold as documents with document portions that match the document portion of the originating document.

There are various techniques that search engine component 430 may use to identify a match. In one implementation, search engine component 430 may divide videos into frames and use a technique, similar to a technique used by search engine component 430 in determining image matches, to identify matches in the frames of two videos. Search engine component 430 may generate a confidence score that is based on the number of frames that match between two videos.

In another implementation, search engine component 430 may use a technique that compares text data, such as closed captioning text or a speech transcription, associated with two videos to determine whether the videos match. In this case, search engine component 430 may use a technique similar to a technique used by search engine component 430 in identifying a text match. In yet another implementation, search engine component 430 may divide the videos into short clips and produce spatio-temporal descriptors that are used to identify matching videos. This technique is described in further detail in D. DeMenthon, "Video Retrieval of Near-Duplicates Using K-Nearest Neighbor Retrieval of Spatio-Temporal Descriptors," Language and Media Processing (LAMP), University of Maryland Institute for Advanced Computer Studies (UMIACS), 2006.

In yet another implementation, search engine component 430 may use another technique, or a combination of techniques, to determine whether two videos match. For example, search engine component 430 may use a hash-based technique, a byte-by-byte comparison technique, or a cyclic redundancy check (CRC) technique. Additionally, or alternatively, search engine component 430 may compare tag information (e.g., labels or other meta-data assigned to the videos) to determine whether two videos match.

With regard to audio data, search engine component 430 may determine, given the audio data of the document portion, whether the audio document portion matches audio associated with documents in index database 440. Search engine component 430 may generate a confidence score for each document in index database 440 that indicates how near a match the document portion audio is to audio in the documents (e.g., a document may include a link for playing or downloading the audio or provide a player via which the audio can be played). Search engine component 430 may identify documents with confidence scores above a certain threshold as documents with document portions that match the document portion of the originating document.

There are various techniques that search engine component 430 may use to identify a match. In one implementation, search engine component 430 may use an audio fingerprinting technique. The audio fingerprinting technique may generate a fingerprint for segments of the audio and compare these segments to audio associated with documents in index database 440. By comparing the segments, search engine component 430 may determine a percentage of overlap between two sets of audio. Search engine component 430 may generate a confidence score based on the amount of overlap between the segments of the two sets of audio.

In another implementation, search engine component 430 may use a technique that compares text data, such as a speech transcription, associated with two sets of audio to determine whether the two sets of audio match. In this case, search engine component 430 may use a technique similar to a technique used by search engine component 430 in identifying text matches.

In yet another implementation, search engine component 430 may use another technique, or a combination of techniques, to determine whether two sets of audio match. For example, search engine component 430 may use a hash-based technique, a byte-by-byte comparison technique, or a cyclic redundancy check (CRC) technique. Additionally, or alternatively, search engine component 430 may use tag information (e.g., labels or other meta-data assigned to the audio data) to determine whether two sets of audio match.

Using one or a combination of the techniques identified above, search engine component 430 may locate documents that contain document portions that match the document portion of the originating document. Additionally, or alternatively, search engine component 430 may determine a concept or topic associated with the originating document and a concept or topic associated with each of the located documents. Search engine component 430 may remove, from further consideration, any documents relating to a concept or topic that does not match the concept or topic of the originating document.

Presenting a Comment in Connection with a Document

Figure 10:
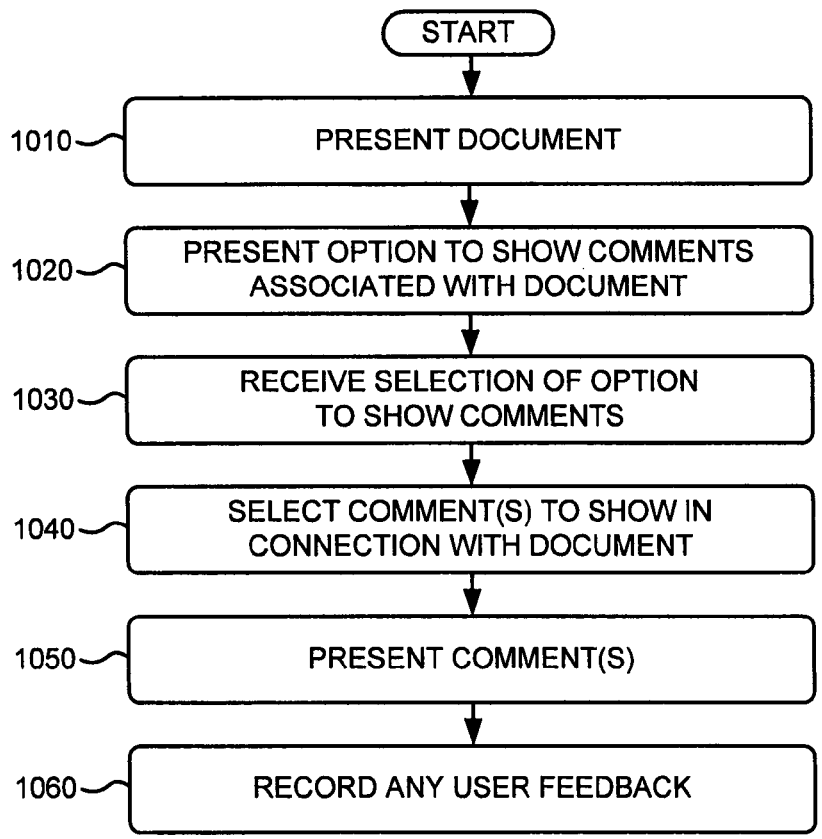
FIG. 10 is a flowchart of an exemplary process for presenting a comment in connection with a document.

FIG. 10 is a flowchart of an exemplary process for presenting a comment in connection with a document. In one implementation, the process of FIG. 10 may be performed by one or more components within client 210, server 220, or a combination of client 210 and server 220. In another implementation, the process may be performed by one or more components within another device or a group of devices separate from or including client 210 and/or server 220. Also, while FIG. 10 shows blocks in a particular order, the actual order may differ. For example, some blocks may be performed in parallel or in a different order than shown in FIG. 10.

The process of FIG. 10 may include presenting a document to a user of client 210 (block 1010). For example, the user may access the document via a browser application operating on client 210. To obtain access to the document, for example, the user might enter an address (e.g., a URL) into the address field of the browser, the user might select a document from a list of documents (e.g., a list of favorites or bookmarks), or the user might perform a search using a search engine and select a search result corresponding to the document.

An option to show comments associated with the document may be presented (block 1020). For example, the browser may include a user interface item (e.g., a button, a menu item, etc.) that may permit the user to turn on and turn off the commenting function provided by the browser. The user may select this user interface item to create a comment, to view a comment, and/or to remove a presented comment from view (e.g., hide the comment from view). In another implementation, the showing of comments regarding a document may occur automatically. For example, a comment, associated with a document, may be automatically shown when the comment has a score above a particular threshold. Exemplary techniques for scoring comments are described below. Thus, in this implementation, a comment that does not have a sufficient score may not be automatically shown.

Figure 11:
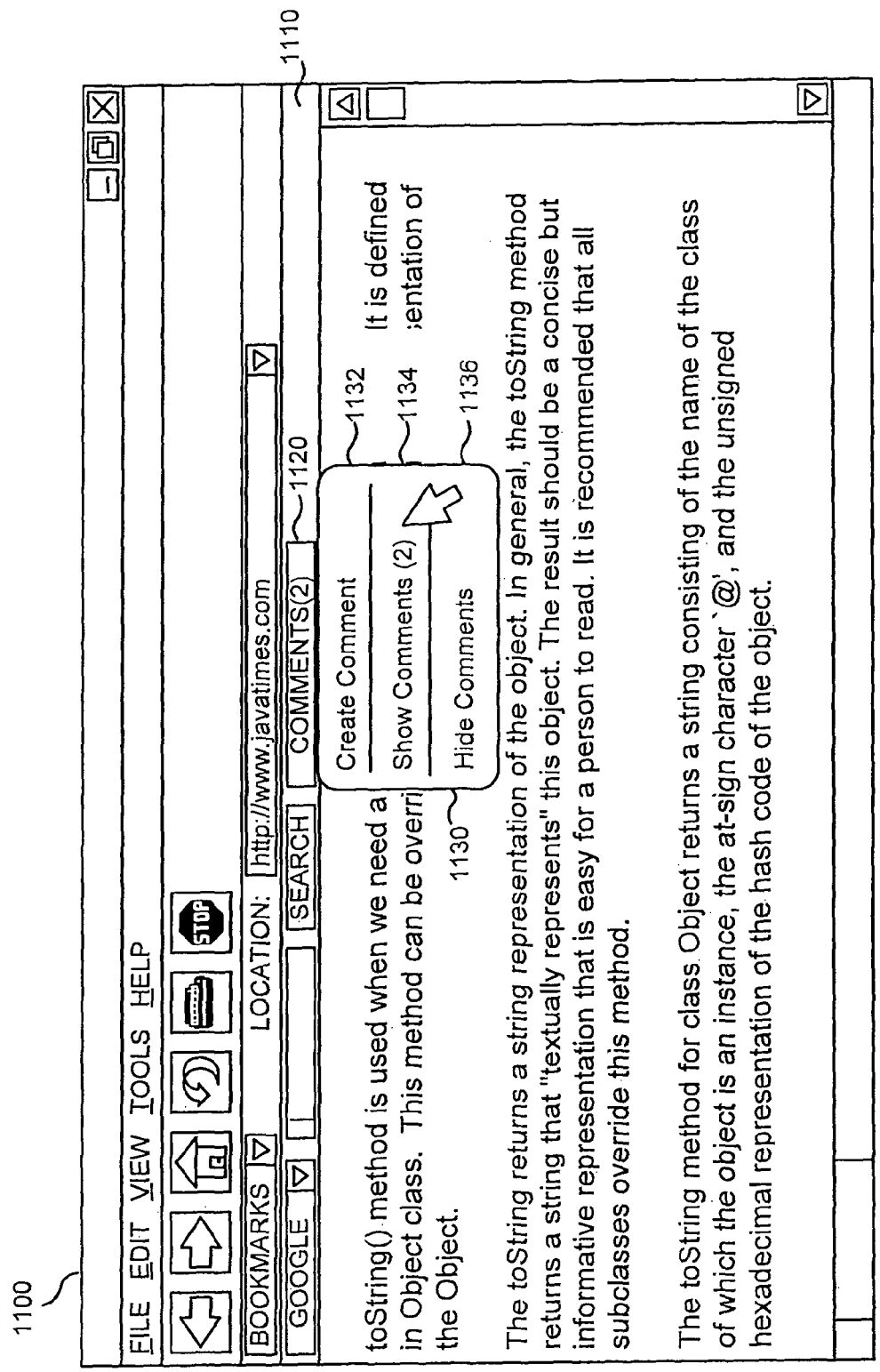
FIGS. 11 and 12 are diagrams of examples of presenting a comment.

FIG. 11 is a diagram of an exemplary user interface that may be presented to a user to permit the user to activate the commenting function of the browser. As shown in FIG. 11, a browser window 1100 may include an add-on toolbar 1110 that includes a search box and a number of software buttons. In one implementation, toolbar 1110 may include a comments button 1120. Comments button 1120 may optionally include information regarding the number of comments (shown as "(2)" in FIG. 11) that have been previously associated with the document that the user is currently accessing (shown as "www.javatimes.com" in FIG. 11).

Comments button 1120 may permit the user to turn on and off the commenting function. In one implementation, selection of comments button 1120 may cause a menu 1130 to be presented. Menu 1130 may include a number of options including, for example, an option to create a comment 1132, an option to show previously created comments 1134, and an option to hide the comments 1136. The user may select option 1132 to generate a comment regarding the document that the user is currently accessing. The user may select option 1134 to view a comment that was previously associated with the document that the user is currently accessing (e.g., FIG. 11 shows that two comments have been previously associated with the document). The user may select option 1136 to remove any presented comments from view (e.g., hide the comments from view).

Returning to FIG. 10, selection of the option to provide a comment regarding the document may be received (block 1030). For example, the user might activate the commenting feature. In one implementation, the user might activate the commenting feature by selecting an item from a menu or by selecting a button on a toolbar. As shown in FIG. 11, for example, the user may select comments button 1120 on toolbar 1110 within browser window 1100, and/or may select option 1134 on menu 1130.

A comment(s) to show in connection with the document may be selected (block 1040). In one implementation, client 210 may send, to server 220, a request for comments associated with the document. For example, client 210 may send information regarding the document, such as a document identifier for the document, to comments component 410. Comments component 410 may search comments database 420 using, for example, the document identifier for the document to retrieve the comments associated with the document. In another implementation, an index of comments database 420 may be constructed that lists the comments associated with each document. The index may be constructed using existing indexing techniques. The constructed index may be used to select one or more comments to provide in connection with the document. In yet another implementation, the index for comments database 420 may only include those comments having a score above a certain threshold. Exemplary techniques for scoring comments are described below.

Comments component 410 may select which comments to present and/or a manner for presenting the comments. In one implementation, comments component 410 may rank the comments in some manner. For example, comments component 410 may generate a score for each of the comments based on one or more factors associated with the comments. One factor for scoring a comment may include a rating of the comment. User feedback, in the form of a rating, may be obtained for various comments. A user may be permitted to provide a rating with regard to a comment presented in connection with a particular document. In one implementation, the rating may indicate whether the user found the comment useful (positive rating) or not useful (negative rating) in connection with the particular document. In another implementation, the rating may indicate a degree of usefulness, such as a rating from 1 to 5. Not all ratings need to be treated equally. For example, ratings from users may be weighted in some manner based on profiles of the users and/or a history of how the users' rating behavior has been in the past (e.g., how a user's past ratings compared to other users' ratings with regard to a particular comment or a particular set of comments).

Comments component 410 may obtain the rating of a comment from rating(s) field 570 in comments database 420. Comments component 410 may use the rating factor to score a comment and use the score of a comment to determine whether to present that comment (e.g., present only comments with scores above a threshold) and/or a manner in which to present the comments (e.g., present comments in an order based on their scores). By using a rating to score a comment, comments in which users are interested (e.g., that users find useful) may be presented in connection with a document before or, instead of, comments in which users are not interested (e.g., that users did not find useful).

Another factor for scoring a comment may include a rank of an author of the comment. The author of a comment may be ranked based on one or more factors, such as the quantity of comments created by the author, a user feedback rating associated with the author (e.g., users might provide feedback regarding comments created by a particular author and this information may be used to rate the author), or whether the author is the user (e.g., users are typically interested in being presented with their own comments). Comments component 410 may use the author ranking factor to score a comment and use the score of the comment to determine whether to present that comment (e.g., present only comments with scores above a threshold) and/or a manner in which to present the comments (e.g., present comments in an order based on their scores). The rank of an author may reflect the quality of the comment created by that author. Thus, by using an author ranking to score a comment, comments associated with higher ranked authors may be presented over comments associated with lower ranked authors.

Yet another factor for scoring a comment may include a timestamp associated with the comment. Comments component 410 may obtain the timestamp from timestamp field 520 in comments database 420. Comments component 410 may use the timestamp factor to score a comment and use the score of the comment to determine whether to present that comment (e.g., present only comments with scores above a threshold) and/or a manner in which to present the comments (e.g., present comments in an order based on their scores). More recent timestamps may reflect fresh, more relevant comments, and less recent timestamps may reflect stale, less relevant comments. In the case of comments with revisions, timestamps reflecting comments with more modifications may infer more relevant comments than comments with fewer modifications. Thus, by using a timestamp to score a comment, comments that are more recent (or that have more modifications), and thus, potentially more relevant, may be presented over comments that are older (or that have fewer modifications), and potentially less relevant.

A further factor for scoring a comment may include a degree of match between the document portion, associated with the originating document, and the document portion associated with the document that the user is currently accessing. As described above, when search engine component 430 determines whether two document portions match, search engine component 430 may determine a degree of match between the document portions and generate a score based on this degree of match. Comments component 410 may use the degree of match factor to score a comment and use the score of the comment to determine whether to present that comment (e.g., present only comments with scores above a threshold) and/or a manner in which to present the comments (e.g., present comments in an order based on their scores). A comment may be more relevant to a document with a higher degree of match of its document portion than to a document with a lower degree of match to its document portion. Thus, by using a degree of match to score a comment, comments that are associated with a higher degree of matching document portions (thus, potentially more relevant to the document for which the comment is to be presented) may be presented over comments that are associated with a lower degree of matching document portions (thus, potentially less relevant to the document for which the comment is to be presented).

Comments component 420 may use one or more of the above-identified factors, and/or other factors, in scoring the comments associated with the document. Comments component 420 may select one or more of the comments based on the scores of the comments.

The selected comment(s) may be presented (block 1050). For example, comments component 420 may send the selected comment(s) to client 210 for presentation by the browser of client 210. In one implementation, the browser may present one or more of the comments within the browser window in which the document is presented. In another implementation, the browser may present one or more of the comments within a window separate from the window in which the document is presented. In yet another implementation, the browser may create a frame (e.g., a regular frame or iframe) and insert information regarding one or more comments in the frame. In a further implementation, the browser may use another mechanism for presenting one or more of the comments.

Figure 12:
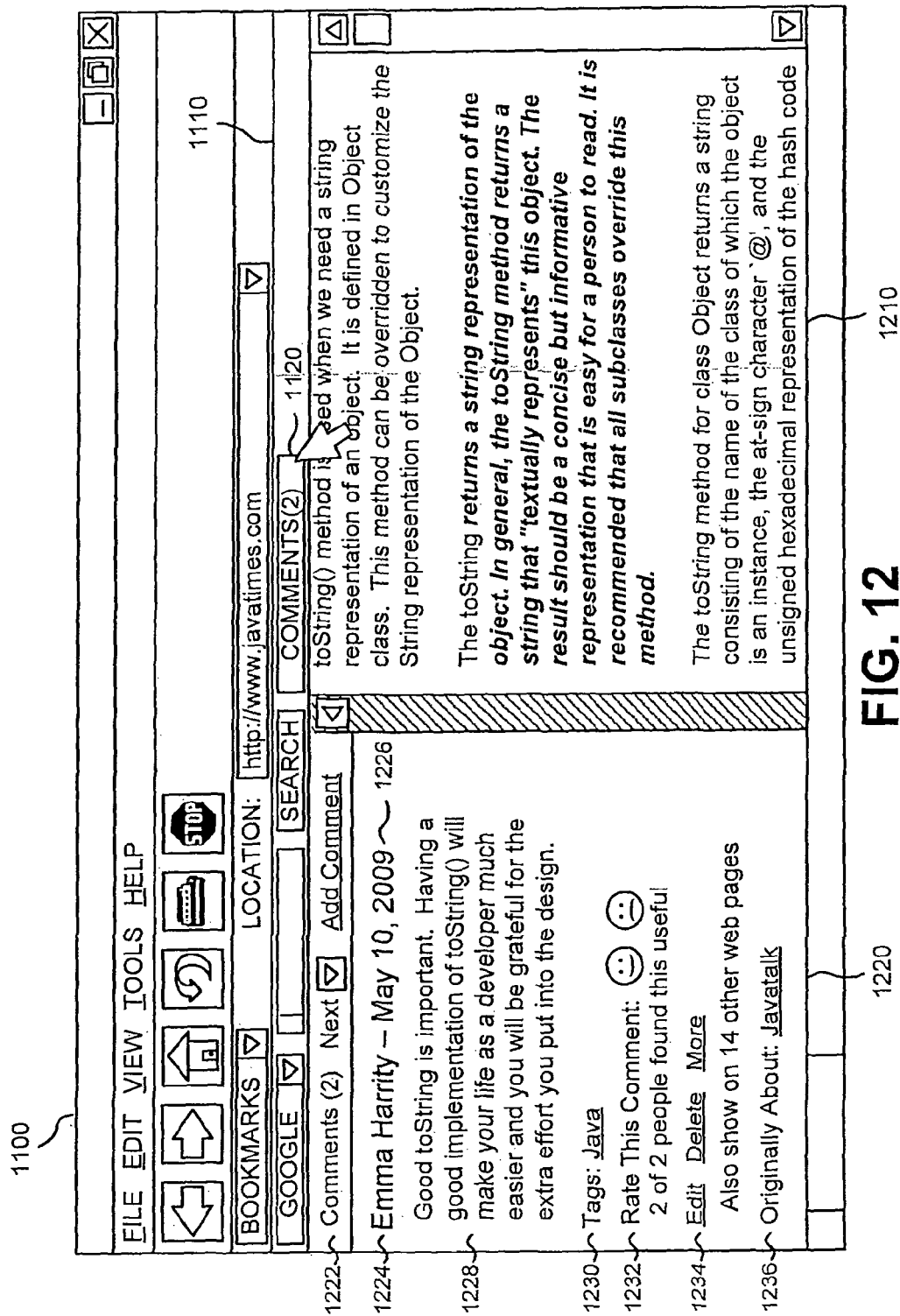

FIG. 12 is a diagram of an exemplary user interface via which a comment may be presented. As shown in FIG. 12, browser window 1100 may include a document section 1210 and a comments section 1220. Document section 1210 may include the content of the document that the user is currently accessing. In one implementation, document section 1210 may be highlighted to identify the portion of the document (i.e., "document portion") to which the comment relates.

Comments section 1220 may include a header section 1222, an author name 1224, a timestamp 1226, a comment content 1228, tags 1230, rating option 1232, options 1234, and originating information 1236. Header section 1222 may include information regarding a quantity of comments that exist for this document, an option to see a next (or previous) comment, and/or an option to add a comment. Author name 1224 may include the name of the user that created the comment. Timestamp 1226 may include the date and/or time at which the comment was created or modified. Comment content 1228 may include the content of the comment.

Tags 1230 may include keywords that may relate to a concept or topic of the comment or the document for which the comment was created. Rating option 1232 may present an option to the user to rate the comment (favorable or unfavorable rating). Rating option 1232 may also present information that indicates how many users found the comment useful (and/or not useful). Options 1234 may present options to the user to edit the comment, delete the comment, and/or obtain additional information regarding the comment. The additional information may include information regarding the other documents with which the comment is associated. Originating information 1236 may include information regarding the document for which the comment was originally created (i.e., the originating document). Originating information 1236 may also present a link to the originating document.

Returning to FIG. 10, any user feedback may be recorded (block 1060). For example, if the user provides user feedback via rating option 1232, the browser may capture this feedback and provide the feedback to comments component 410. Comments component 410 may store the feedback in comments database 420. In one implementation, comments component 410 may combine the feedback with other feedback already received for the comment and this particular document, or for the comment and any document with which the comment has been associated.

CONCLUSION

Implementations, described herein, may spread comments from a document for which the comment was originally created to other documents for which the comment may be relevant.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6, 9, and 10, the order of the blocks may be modified in other implementations. Further, non-dependent blocks may be performed in parallel.

Also, exemplary graphical user interfaces have been described with respect to FIGS. 7, 8, 11, and 12. In other implementations, the graphical user interfaces may include more, fewer, or different pieces of information.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor—creating a specific purpose processor).

Further, it has been described that scores are generated for comments. The scoring scheme has been described where higher scores are better than lower scores. This need not be the case. In another implementation, the scoring scheme may be switched to one in which lower scores are better than higher scores.

Also, it has been described that users create comments regarding document portions. In another implementation, comments may be created for entire documents.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   receiving, using at least one processor of the one or more server devices, a comment associated with a first document,
   the comment corresponding to a first portion of the first document;
   determining, using the at least one processor of the one or more server devices, that a size of the first portion is greater than a threshold size;
   based on determining that the size of the first portion is greater than the threshold size, identifying, using the at least one processor of the one or more server devices, one or more second documents,
   each of the one or more second documents including a respective second portion that matches the first portion;
   storing, in a memory associated with the one or more server devices, the comment in association with the first document and the one or more second documents; and
   presenting, using the at least one processor of the one or more server devices, the comment and another comment in connection with a particular second document, of the one or more second documents, when the particular second document is accessed by a user,
   presenting the comment and the other comment in connection with the particular second document further including:
   generating a score for the comment based on a degree of match between the first portion and the respective second portion,
   generating another score for the other comment with respect to the particular second document based on a degree of match between the respective second portion and a third portion, of the first document, that differs from the first portion,
   the other comment being associated with the third portion, and
   presenting, in connection with the particular second document, the comment relative to the other comment,
   the comment and the other comment being ranked in an order that is based on the score and the other score.

2. The method of claim 1, where receiving the comment associated with the first document includes:
   receiving one or more of:
   a name of an author who created the comment,
   a timestamp indicating a date or time at which the comment was created or modified,
   a content of the comment,
   information regarding the first portion to which the comment corresponds, or
   an identifier for the first document.

3. The method of claim 1, further comprising:
   storing the comment in association with only the first document when the size of the first portion is not greater than the threshold size.

4. The method of claim 1, where the first portion includes text; and
   where determining that the size of the first portion is greater than the threshold size includes:
   determining that the text includes a number of terms that is greater than a threshold number of terms.

5. The method of claim 1, where the first portion includes image data; and
   where determining that the size of the first portion is greater than the threshold size includes:
   determining that the image data, when rendered, has an image size that is greater than a threshold image size.

6. The method of claim 1, where the first portion includes at least one of video data or audio data; and
   where determining that the size of the first portion is greater than the threshold size includes:
   determining that the at least one of the video data or the audio data is associated with a duration that is greater than a threshold duration.

7. The method of claim 1, where identifying the one or more second documents includes:
   identifying one of the one or more second documents that includes the respective second portion that exactly matches the first portion.

8. The method of claim 1, where identifying the one or more second documents includes:
   identifying one of the one or more second documents that includes the respective second portion that approximately matches the first portion.

9. The method of claim 1, where identifying the one or more second documents further includes:
   determining a first topic associated with the first document;
   determining a second topic associated with one of the one or more second documents;
   comparing the first topic and the second topic;
   discarding the one of the one or more second documents, for association with the comment, when the first topic does not match the second topic; and
   retaining the one of the one or more second documents, for association with the comment, when the first topic matches the second topic.

10. The method of claim 1, where storing the comment in association with the first document and the one or more second documents includes:
    storing, in the memory, information linking respective identifiers associated with the first document and the one or more second documents to information regarding the comment.

11. The method of claim 1, where generating the score for the comment further includes:
    generating the score for the comment further based on one or more of:
    user feedback received in connection with the comment,
    an identity of an author who created the comment, or
    a timestamp indicating a date or time at which the comment was created or modified.

12. The method of claim 1, where presenting the comment and the other comment in connection with the particular second document further includes:
    receiving a request from a client device associated with the user,
    where the request includes information identifying the particular second document, and identifying, based on the request, the comment in the memory.

13. The method of claim 1, where presenting the comment and the other comment in connection with the particular second document further includes:
   determining that the score satisfies a threshold; and
   presenting the comment, in connection with the particular second document, further based on determining that the score satisfies the threshold.

14. The method of claim 1, where presenting the comment and the other comment further includes:
   providing the comment for presentation on a display of a client device associated with the user,
   the comment being presented on the display concurrently with a content of the particular second document.

15. The method of claim 1, where storing the comment includes:
   storing, in the memory, a content of the comment, information associated with the first portion, and at least one of:
   information associated with an author who created the comment,
   a timestamp indicating a date or time at which the comment was created or modified,
   an identifier associated with the first document,
   an identifier associated with the particular second document, or
   a rating associated with the comment.

16. A system, comprising:
   one or more devices to:
   receive a comment associated with a first document,
   the comment corresponding to a first portion of the first document,
   determine that a size of the first portion is greater than a threshold size,
   identify a second document based on determining that the size of the first portion is greater than the threshold size,
   a second portion of the second document matching the first portion,
   store the comment in association with the first document and the second document,
   receive, from a client device, information indicating that the client device is accessing the second document, and
   provide the comment and another comment for presentation, in connection with the second document, on a display associated with the client device,
   the one or more devices, when providing the comment and the other comment for presentation in connection with the second document, being further to:
   generate a score for the comment with respect to the second document based on a degree of match between the first portion and the second portion,
   generate another score for the other comment with respect to the second document based on a degree of match between the second portion and a third portion, of the first document, that differs from the first portion,
   the other comment being associated with the third portion, and
   provide, for presentation in connection with the second document, the comment relative to the other comment,
   the comment and the other comment being ranked in an order that is based on the score and the other score.

17. The system of claim 16, where the one or more devices are further to:
   determine a first topic associated with the first document,
   determine a second topic associated with the second document,
   discard the second document, for association with the comment, when the first topic does not match the second topic, and
   retain the second document, for association with the comment, when the first topic matches the second topic.

18. A server device, comprising:
   a memory; and
   a processor to:
   receive a comment associated with a first document, the comment corresponding to a first portion of the first document,
   determine that a size of the first portion satisfies a threshold size,
   identify, based on determining that the size of the first portion satisfies the threshold size, a second document that includes a second portion that matches the first portion of the first document,
   store, in the memory, the comment in association with the first document and the second document,
   receive, from a client device, information indicating that the client device is accessing the second document, and
   provide, based on the information, the comment and another comment for presentation in connection with the second document for display by the client device,
   the processor, when providing the comment and the other comment for presentation in connection with the second document, being further to:
   generate a score for the comment with respect to the second document based on a degree of match between the first portion and the second portion,
   generate another score for the other comment with respect to the second document based on a degree of match between the second portion and a third portion, of the first document, that differs from the first portion, and
   provide, for presentation in connection with the second document, the comment relative to the other comment,
   the comment and the other comment being ranked in an order that is based on the score and the other score.

19. The server device of claim 18, where the first portion of the first document includes text; and
   where, when determining that the size of the first portion of the first document is greater than the threshold size, the processor is to determine that the text includes a number of terms that is greater than a threshold number of terms.

20. The server device of claim 18, where the first portion of the first document includes image data; and
   where, when determining that the size of the first portion of the first document is greater than the threshold size, the processor is to determine that the image data, when rendered, has an image size that is greater than a threshold image size.

21. The server device of claim 18, where the first portion of the first document includes video data or audio data; and
   where, when determining that the size of the first portion of the first document is greater than the threshold size, the processor is to determine that the video data or the audio data is associated with a duration that is greater than a threshold duration.

22. The server device of claim 18, where, when identifying the second document, the processor is to identify the second document when the second portion exactly matches the first portion of the first document.

23. The server device of claim 18, where, when identifying the second document, the processor is to identify the second document when the second portion approximately matches the first portion of the first document.

24. The server device of claim 18, where, when receiving the comment associated with the first document, the processor is further to:
receive information that includes one or more of:
a name of an author who created the comment,
a timestamp indicating a date or time at which the comment was created or modified,
a content of the comment,
information regarding the first portion of the first document to which the comment corresponds, or
an identifier for the first document, and
store the received information in association with the comment.

25. The server device of claim 18, where, when identifying the second document, the processor is to:
determine a first topic associated with the first document,
determine a second topic associated with the second document,
compare the first topic and the second topic,
discard the second document, for association with the comment, when the first topic does not match the second topic, and
retain the second document, for association with the comment, when the first topic matches the second topic.

26. The server device of claim 18, where, when storing the comment in association with the first document and the second document, the processor is to store, in the memory, an identifier associated with the first document and an identifier associated with the second document in connection with information regarding the comment.

27. The server device of claim 18, where, when generating the score for the comment, the processor is to generate the score for the comment further based on one or more of:
user feedback received in connection with the comment,
an identity of an author who created the comment, or
a timestamp indicating a date or time at which the comment was created or modified.

28. The server device of claim 18, where, when receiving information indicating that the client device is accessing the second document, the processor is to:
receive a request from the client device,
where the request includes information identifying the second document,
identify, based on the request, the comment in the memory, and
determine whether to transmit the comment to the client device for presentation in connection with the second document.

29. The server device of claim 28, where, when determining whether to transmit the comment, the processor is to determine whether to transmit the comment to the client device based on the score for the comment.

30. The server device of claim 18, where, when transmitting the comment, the processor is to provide the comment for presentation on the display of the client device,
the comment being presented on the display concurrently with a content of the second document.

31. The system of claim 16, where the one or more devices are further to:
store in connection with the comment:
content of the comment,
information associated with the first portion of the first document, and
at least one of:
information associated with an author who created the comment,
a timestamp indicating a date or time at which the comment was created or modified,
an identifier associated with the first document,
an identifier associated with the second document, or
a rating associated with the comment.

32. The system of claim 16, where the one or more devices, when generating the score for the comment, are further to:
generate the score for the comment further based on one or more of:
user feedback received in connection with the comment,
an identity of an author who created the comment, or
a timestamp indicating a date or time at which the comment was created or modified.

33. The method of claim 1,
where presenting the comment relative to the other comment includes:
ordering the comment and the other comment in a ranked list based on the score and the other score, and
providing the ranked list for display in connection with the second document.

34. The system of claim 16,
where the one or more devices, when providing the comment and the other comment for presentation in connection with the second document, are further to:
order the comment and the other comment in a ranked list based on the score and the other score, and
provide the ranked list for display in connection with the second document.

* * * * *